Patented Jan. 27, 1925.

1,524,428

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

GOLF BALL AND METHOD OF COVERING THE SAME.

No Drawing.　　　Application filed April 19, 1921.　Serial No. 464,108.

*To all whom it may concern:*

Be it known that I, WILLIAM C. GEER, a citizen of the United States, residing at Akron, in the county of Summit and State of Ohio, have invented a certain new and useful Golf Ball and Method of Covering the Same, of which the following is a specification.

This invention relates to the manufacture of golf-balls, and its principal objects are to increase the toughness or resistance of the cover without impairing its flexibility, and to avoid its tendency to soften objectionably in a hot sun.

Golf-ball covers are commonly made of balata or gutta-percha, these being closely-related products of the latex from the order of tropical trees and shrubs known as *Sapotaceae*. The chief difference between these gums is shown in the influence of air, balata remaining unaffected for a longer time. The extracted or resin-free balata commonly used is also softer than gutta-percha under ordinary temperatures and does not become as firm when cooled.

By means of my invention I am enabled to provide a golf-ball with a cover of vulcanized balata or balata-like material such as gutta-percha, or mixtures of these substance with each other, or mixtures of either or both with rubber thereby rendering the cover practically immune from cutting even when severely "topped," decreasing its tendency to soften when hot, and improving the adhesion between the cover and the rubber thread or stringy surface of the center portion.

In the preferred mode of practicing the invention, I employ accelerators which promote rapid vulcanization, and am thus enabled to cure the cover in place on the ball without injury to its inner parts, particularly if the cover is only partially cured under heat and pressure while its parts are being molded and consolidated upon the rubber-wound center in the usual covering mold, the ball being then removed and the curing allowed to continue at a lower temperature in air. The accelerator and other constituents are so chosen that the partial heat cure for setting the coating will be effected at a moderate or low vulcanizing temperature and in a short time.

The accelerator used may be any one of several chemicals which induce a rapid vulcanization, and while I have found that rapid accelerators used in rubber compositions may in general be employed where a large proportion of the cover composition consists of balata, I prefer to use an accelerator of the dithio carbonic acid series and more especially a metal alkyl xanthate (or xanthogenate), such for example as zinc amyl xanthate, which promotes a very rapid vulcanization at temperatures of about 220° F. and which tends to whiten the balata composition containing it as the latter ages.

By way of example I may take parts of materials by weight as follows:

| | Parts. |
|---|---|
| Balata (extracted) | 97 |
| Raw rubber | 3 |
| Zinc oxide | 3 |
| Sulphur | 3 |
| Zinc amyl xanthate | 2 |
| Total | 108 | or by percentages (neglecting minor fractions):

| | Per cent. |
|---|---|
| Balata (extracted) | 90.0 |
| Raw rubber | 2.8 |
| Zinc oxide | 2.8 |
| Sulphur | 2.8 |
| Zinc amyl xanthate | 1.5 |
| | 99.9 |

These proportions, as well at the nature of the ingredients, may be considerably varied according to the quality of cover desired. The rubber preferably acts as a vehicle for the accelerator as explained below and may be very largely substituted for balata, particularly for a soft-wound ball. On the other hand it may be entirely omitted. Other pigments may be used, or none at all, and other accelerators, as already pointed out.

In milling the ingredients, the balata, sulphur and zinc oxide are preferably mixed in one batch and the rubber and accelerator in another in order to minimize air curing or curing on the mill. The two batches are then milled together, the final sheet is cut into circular pieces of approximately the size required to cover half a ball, the pieces are formed into hemispherical shape while warm, allowed to cool in their forming molds in order to retain their shape, and used within a reasonably short time. If no rubber is used, a portion of the balata may be mixed with the sulphur and the pigment in one batch, and the rest of the balata with the accelerator in the other batch, after which the two batches are milled together as described.

Two of the half-cover blanks are then pressed onto the opposite sides of a golf-ball center, which may be of the usual type comprising a core wound with highly-tensioned rubber tape, until the halves cling to the ball; but the cups are not forced completely together on the center while they are cold. The assembled center and cups are then placed between the halves of the usual covering mold, which is located between the platens of a hot-plate press, the relatively stiff cover parts at first holding the mold open until the heat of the press has softened them, after which pressure is applied to close the mold, form the cover completely about the ball and consolidate it with the surface portions of the rubber winding. The balls are left in the press until the cover has become sufficiently cured to hold its molded shape, but preferably not long enough to complete the vulcanization or over-heat the rubber windings. The preliminary heating in the partly-closed mold may be for a period of about three minutes, and the further heating under pressure for another three minutes, at an average temperature of about 210° F. to 220° F., after which the molds are placed in a cooling press and are then opened and the balls taken out and their overflow rands or fins are removed. The balls are then allowed to "air-cure" at ordinary room temperature for from four to seven days, during which the hardness or toughness of their covers appreciably increases, and they may be painted at any appropriate stage of the proceedings.

While the time of heating in the mold might be considerably extended without injury to the rubber thread in view of the comparatively low temperature employed, it is considered desirable to leave the balls in the mold only long enough to initiate the cure and obtain a substantial degree of setting of the cover material, for by thus shortening the preliminary cure the molds may be used for a larger production. However, I do not wholly limit myself to this procedure. The cover is preferably vulcanized homogeneously or throughout, and not merely at the surface, although I might vary the process.

Not only does this improved method greatly increase the toughness of the cover without injury to the rubber thread, but it does so without sacrificing anything in resiliency, the flight for a given impact being as good as with the ordinary cover or better, and the adhesion of the cover to the stringy surface of the center being improved by reason of the vulcanization so that these portions act more as a unit and the cover does not tend to enlarge either as a whole or locally.

As I believe myself to be the first to provide a golf-ball having a center containing tense windings of vulcanized rubber thread with a tough, non-brittle cover comprising a quick-curing gum or gums vulcanized in place upon said center, this invention is not wholly limited to the use of balata or gutta percha as an ingredient, or as the principal ingredient of the cover.

I claim:

1. A golf-ball having a vulcanized cover composed principally of balata or the like, combined with a vulcanization accelerator of the dithio carbonic acid series.

2. A golf-ball having a vulcanized cover composed principally of balata or the like, together with small proportions of rubber, sulphur, a light-colored pigment, and zinc amyl xanthate.

3. A golf-ball having a cover composed of a vulcanized mixture containing the following substances present in approximately the following proportions: balata or the like, 90 per cent; rubber, 2.8 per cent; sulphur, 2.8 per cent; zinc oxide, 2.8 per cent; and zinc amyl xanthate, 1.5 per cent.

4. A golf-ball having a center comprising pre-vulcanized, tense rubber thread, and a quick-curing, tough, gum cover vulcanized thereon.

5. A golf-ball having a center comprising pre-vulcanized, tense rubber thread, and a cover vulcanized thereon and composed principally of balata or the like.

6. A golf-ball having a center comprising pre-vulcanized, tense rubber thread, and a cover vulcanized thereon and composed largely of balata or the like, together with small proportions of rubber, sulphur, a rapid accelerator of vulcanization, and a light-colored pigment.

7. The method of covering golf-balls which comprises mixing balata or the like with a vulcanizing agent and a rapid accelerator of vulcanization, forming the mixture into cover parts and applying said parts to a center of tense, vulcanized, rubber windings, placing the ball in a mold, closing and heating the mold to form and compress the cover upon the center and unite it with the latter's surface windings, continuing the heat for such time as partially to cure the cover but not to injure the rubber windings, removing the ball from the mold and completing the cure in air at a lower temperature.

8. The method of covering golf balls which comprises mixing a relatively-large proportion of balata or the like with relatively-small proportions of raw rubber, sulphur and a rapid accelerator of vulcanization, forming the mixture into cover parts and applying said parts to a center composed of tense, vulcanized rubber windings, molding and partially curing the cover on the ball in a heated mold, removing the ball from said mold and completing the cure at ordinary temperature.

9. The method of covering golf-balls which comprises mixing balata or the like with sulphur, an accelerator of the dithio carbonic acid series and a light-colored pigment, forming the mixture into cover parts and applying said parts to a center of tense, vulcanized rubber windings, molding and partially curing the cover on the ball in a heated mold, removing the ball from the mold and allowing the cure to continue in air at a lower temperature.

10. The method of covering golf-balls which comprises mixing balata or the like with a vulcanizing agent and an accelerator adapted to promote vulcanization at a relatively low temperature, applying a cover made of the mixture to a golf-ball center, molding and semi-vulcanizing the cover on the ball for a few minutes in a hot mold, removing it therefrom and continuing the vulcanization for several days in air at ordinary temperature.

11. The method of covering golf-balls which comprises mixing balata or the like with sulphur and an accelerator of the dithio carbonic acid series, applying cover parts made of the mixture to a rubber-wound center, heating the ball in a mold at first partly open and then closed under pressure for a total of approximately six minutes to effect a partial curing of the cover, removing and trimming the ball, and allowing it to air-cure at ordinary temperature for from four to seven days.

In witness whereof I have hereunto set my hand this 14th day of April, 1921.

WILLIAM C. GEER.